United States Patent [19]

Worden

[11] 4,198,902

[45] Apr. 22, 1980

[54] ANTIJAMMING MECHANISM FOR CONVEYOR

[75] Inventor: Donald G. Worden, Beaver Dam, Wis.

[73] Assignee: Stainless Steel Fabricating, Inc., Columbus, Wis.

[21] Appl. No.: 895,330

[22] Filed: Apr. 11, 1978

[51] Int. Cl.$^2$ ............................................. A01J 25/08
[52] U.S. Cl. ........................................ 99/535; 99/452; 134/125; 134/134; 198/454; 198/456; 198/506
[58] Field of Search ............... 198/342, 446, 452–456, 198/506; 302/11, 14; 271/221, 238, 240; 99/452, 535; 134/124–126, 133, 134, 198, 271, 99; 406/82

[56] References Cited

U.S. PATENT DOCUMENTS

| 1,755,721 | 4/1930 | Winkler et al. ................. 198/446 |
| 2,824,665 | 2/1958 | Lamouria . |
| 2,998,118 | 8/1961 | Mencacci et al. . |
| 3,053,265 | 9/1962 | Erie . |
| 3,361,426 | 1/1968 | Pawlikowski et al. .......... 271/240 X |
| 3,499,687 | 3/1970 | Ellis . |
| 3,701,565 | 10/1972 | Gutterman et al. .................. 302/14 |
| 3,707,216 | 12/1972 | Peres . |

FOREIGN PATENT DOCUMENTS 2411317  10/1974  Fed. Rep. of Germany .......... 198/452

*Primary Examiner*—Jeffrey V. Nase

[57] ABSTRACT

A conveyor mechanism for automatically removing articles, such as cheeses, floating in a liquid includes a horizontal section adapted to be positioned below the surface of the liquid and an integral upwardly inclined section. Articles that float upon the horizontal section are moved to the inclined section which lifts them out of the liquid and delivers them to an elevated point. The articles are prevented from jamming the conveyor by moving stepped walls located on either side of the horizontal section at the location where jamming is likely to occur. The stepped walls move longitudinally back and forth 180° out of phase with one another to gently bump and align the articles. In the preferred embodiment, a single motor drives the conveyor and rotates cam wheels which move the stepped walls.

9 Claims, 5 Drawing Figures

ANTIJAMMING MECHANISM FOR CONVEYOR

BACKGROUND OF THE INVENTION

This invention relates generally to conveyor mechanisms, and more specifically to a conveyor mechanism for removing cheese from liquid baths, which conveyor has moving stepped sidewalls which bump and align the cheeses and prevents them from jamming the conveyor.

In the process of cheesemaking, cheeses are cured in tanks of brine solution. Upon completion of the curing step, it is necessary to remove the cheese from the brine. Normally, the cured cheeses are manually removed from the brine tanks or flumes by the factory workers. However, manual removal is not only time consuming, but also can expose the cheeses to unsanitary conditions.

In the past, there have been various attempts to eliminate the need for manual removal of the cheeses from the brine by using conventional conveyor systems. Such attempts have not been completely satisfactory because the cheeses are relatively soft and can be easily damaged if the conveyor jams. Furthermore, the use of conventional types of jam breaking mechanisms, such as those which are normally used on conveyors carrying more durable articles such as cans, bottles or the like, is not practical as such mechanisms can themselves damage the cheese. Therefore, a need exists for a practical means of automatically removing cheeses from brine without damaging the cheeses.

SUMMARY OF THE INVENTION

It is the general object of the present invention to disclose a conveyor mechanism for automatically removing floating articles from a liquid.

It is a further object to disclose a conveyor mechanism which includes a novel jam breaking mechanism which does not damage easily damaged articles, such as cheeses.

It is a still further object to disclose a conveyor mechanism in which the jam breaking mechanism and the conveyor belt are driven by a single motor.

The conveyor mechanism of the present invention includes a generally horizontal section and an integral upwardly inclined conveyor section. The horizontal section of the conveyor is adapted to be positioned below the surface of a liquid in which articles are floating so that the articles will be carried by the flow of the liquid into contact with the inclined section where upon they will be tipped slightly backwards into full bottom contact with the conveyor and lifted out of the liquid and delivered to an elevated station. The conveyor mechanism further includes moving stepped walls located on both sides of the horizontal section which move back and forth longitudinally 180° out of phase with one another to gently bump and align the articles and prevent them from jamming the conveyor. A single motor drives the conveyor belt and rotates the cam wheels that move the stepped walls.

In an especially preferred embodiment, all the parts of the conveyor mechanism which come in contact with the liquid or the conveyed articles are made of readily sanitizable materials and meet all the requirements of food regulatory agencies.

Further objects and advantages of the invention will be apparent from the drawings and the description of the preferred embodiment which follows.

DESCRIPTION OF THE PREFERRED EMBODIMENT

Figure 1:
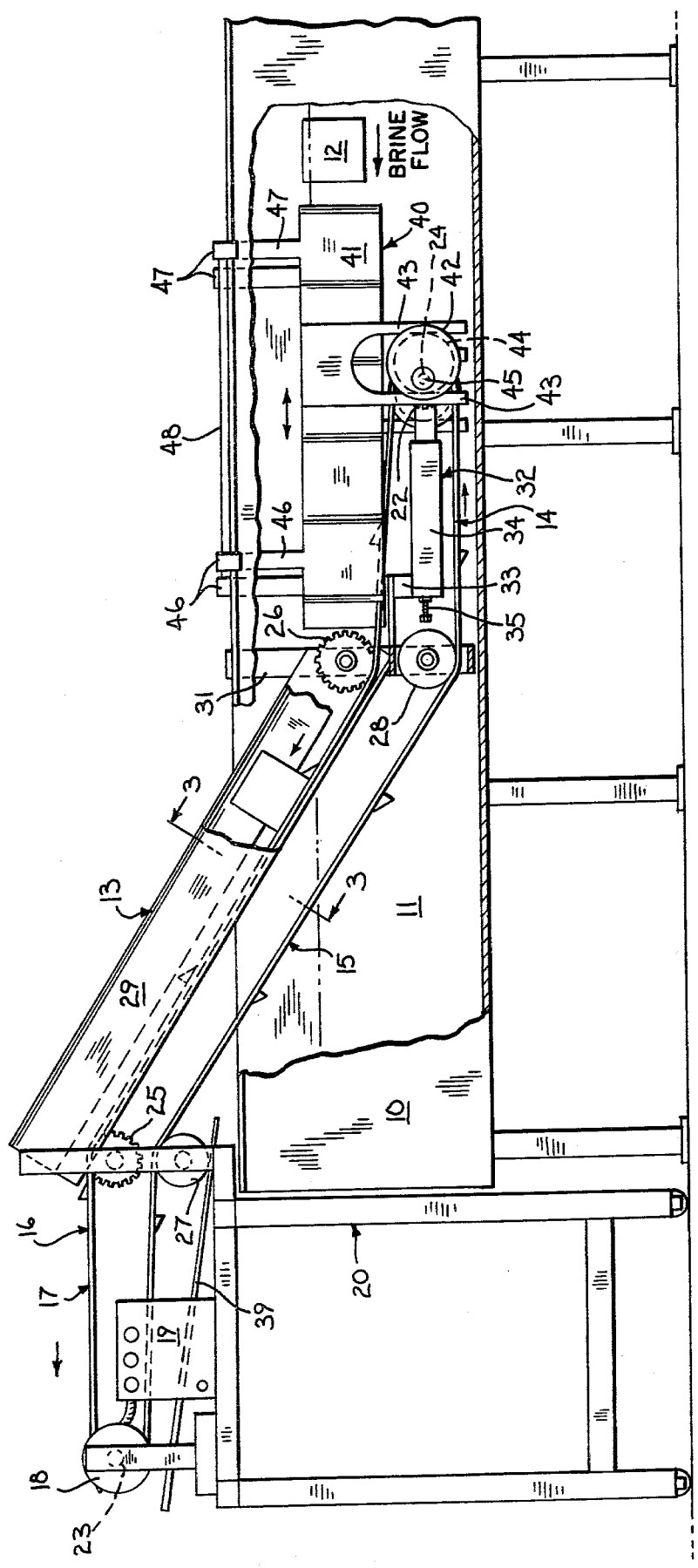
FIG. 1 is a side elevational view, partially in section, showing the preferred conveyor mechanism of the present invention.

Referring now to the drawings, there is seen in FIG. 1 a tank or flume 10 containing brine 11 in which cheeses 12 are floating. The cheeses 12 are moved by the flow of the brine to a conveyor mechanism generally designated as 13. The conveyor mechanism 13 includes a horizontal conveyor section 14 positioned below the surface of the brine 11 and an integral inclined conveyor section 15 which leads to an elevated horizontal section or station 16.

Figure 2:
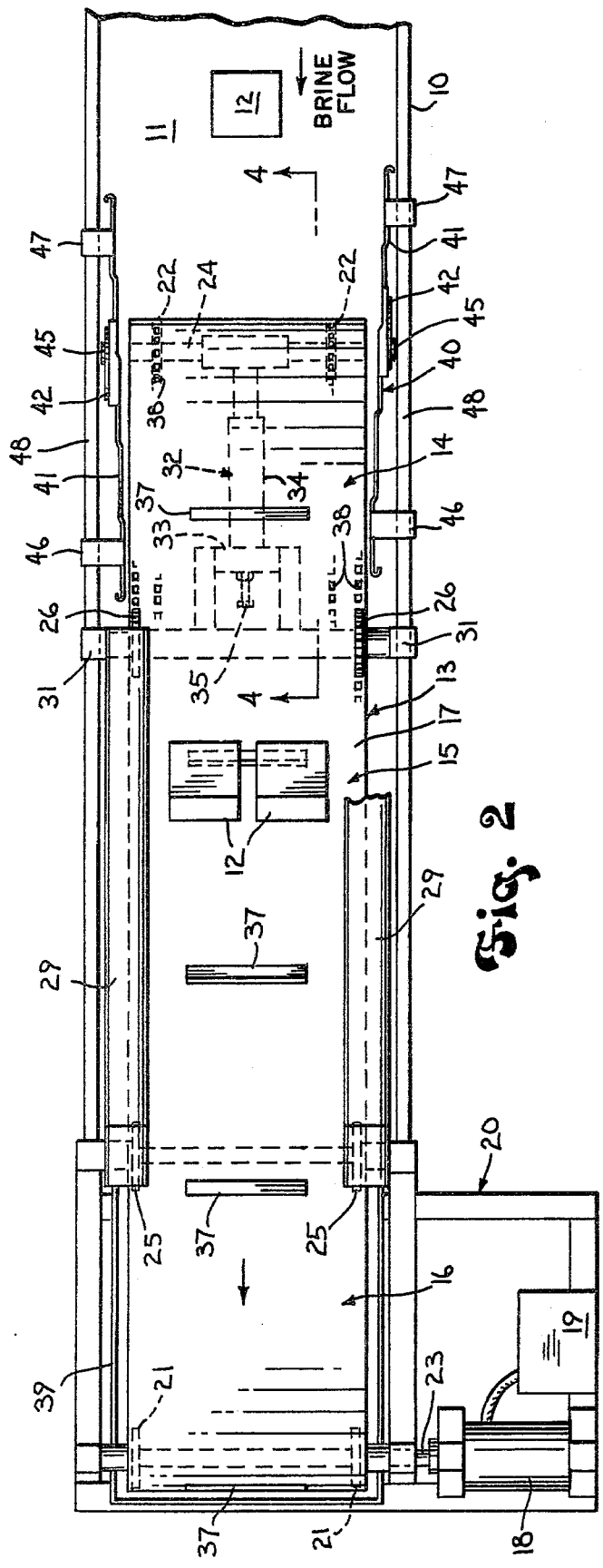
FIG. 2 is a top plan view of the conveyor mechanism of FIG. 1.

The conveyor mechanism 13 includes an endless conveyor belt 17 which is driven and controlled by a motor 18 and controls 19, respectively, which are mounted on a support frame 20. As seen best in FIG. 2, the conveyor belt 17 is wrapped about a pair of drive sprocket wheels 21 and a pair of idler sprocket wheels 22. The drive sprocket wheels 21 are mounted on a drive shaft 23 connected to the motor 18 and the idler sprocket wheels 22 are mounted on an idler wheel axle 24. Returning to FIG. 1, it can be seen that the belt 17 is guided and formed by additional sprocket wheels 25 and 26 and rollers 27 and 28.

Figure 3:
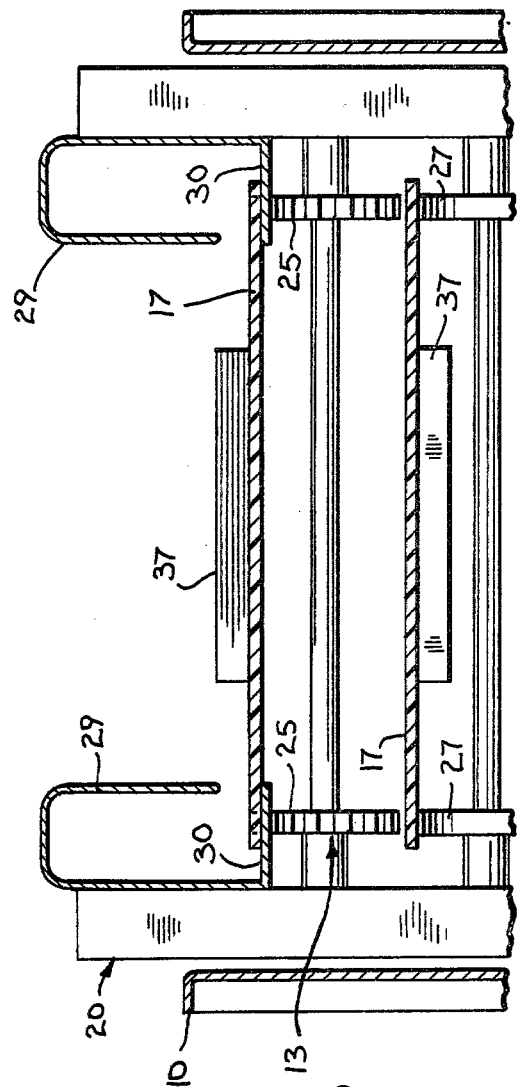
FIG. 3 is a plan view taken substantially along line 3—3 of FIG. 1.

The inclined section 15 of the conveyor mechanism 13 is equipped with guide rails 29 which prevent the cheeses 12 from falling off the sides of the conveyor belt 17 as they move to the elevated section 16. As seen only in FIG. 3, each of the guide rails 29 is provided with an inwardly directed lower ledge 30 which supports the belt 17 and prevents it from sagging.

The conveyor mechanism 13 is maintained in proper position in the tank or flume 10 by the support frame 20 and is further supported and stabilized by a pair of support brackets 31 which hook over the top edges of the side walls of the tank or flume 10.

As seen in FIGS. 1, 2, 4 and 5 of the drawings, the conveyor mechanism 13 is provided with conveyor belt adjusting mechanism 32 for varying the tightness or tension of the belt 17. The adjusting mechanism 32 is attached to the opposed support brackets 31 by a bracket 33 and includes a telescoping rod 34 which extends between the bracket 33 and the idler wheel axle 24. An adjustment screw 35 controls the length of the telescoping rod 34 and the tension of the belt 17. If desired, an adjusting mechanism can be located instead at the elevated horizontal section 16 end of the conveyor.

In the preferred embodiment, the belt 17 is made up of a plurality of links 36 which are of an inert material such as plastic. The links 36 are preferably joined together by pins (not shown) to form the belt 17. The links 36 are identical in shape except for the links 36a which are provided with pick-up flights 37. The flights 37 help start the cheeses 12 on their way up the inclined section 15 and also prevent them from sliding backwards back to the bath. The links 36 are preferably provided with openings 38 to engage the teeth of the sprocket wheels 21, 22, 25 and 26. The openings 38 also permit the brine to flow through the belt 17 and to drain from the cheeses 12 so that it can be returned to the tank 10 by the drip pan 39.

Figure 4:
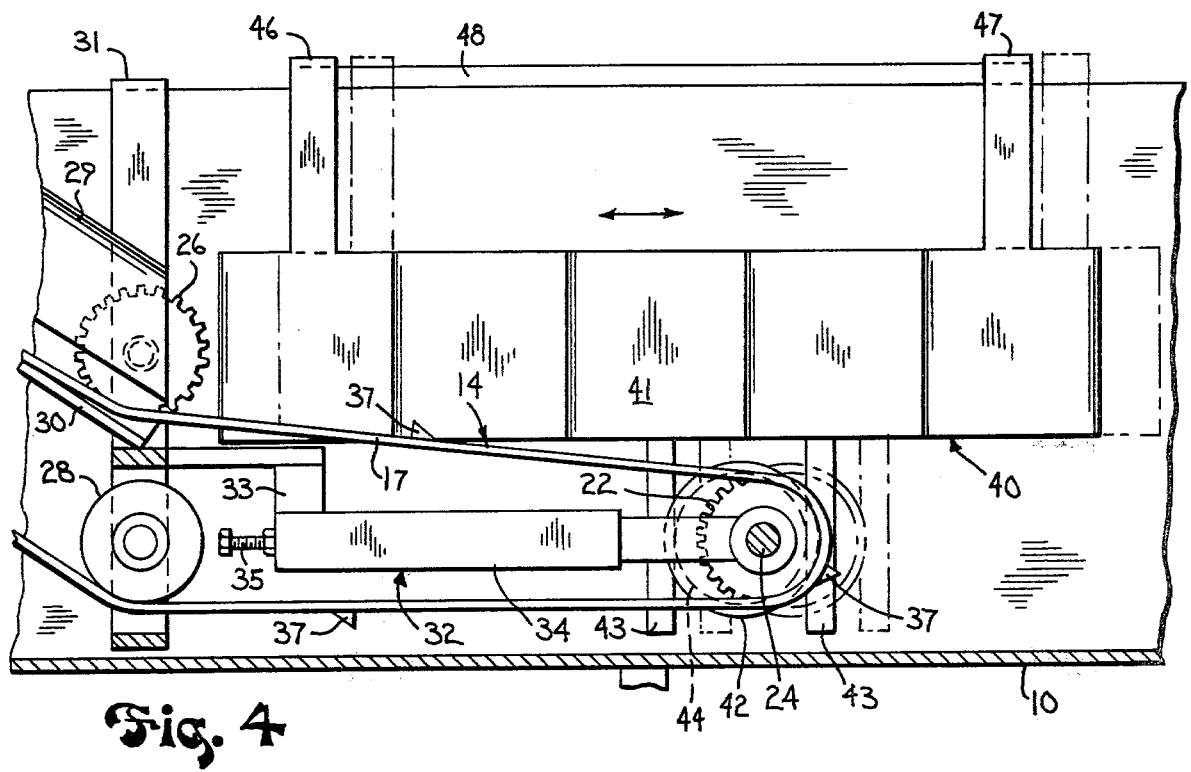
FIG. 4 is an enlarged view taken substantially along line 4—4 of FIG. 2.
Figure 5:
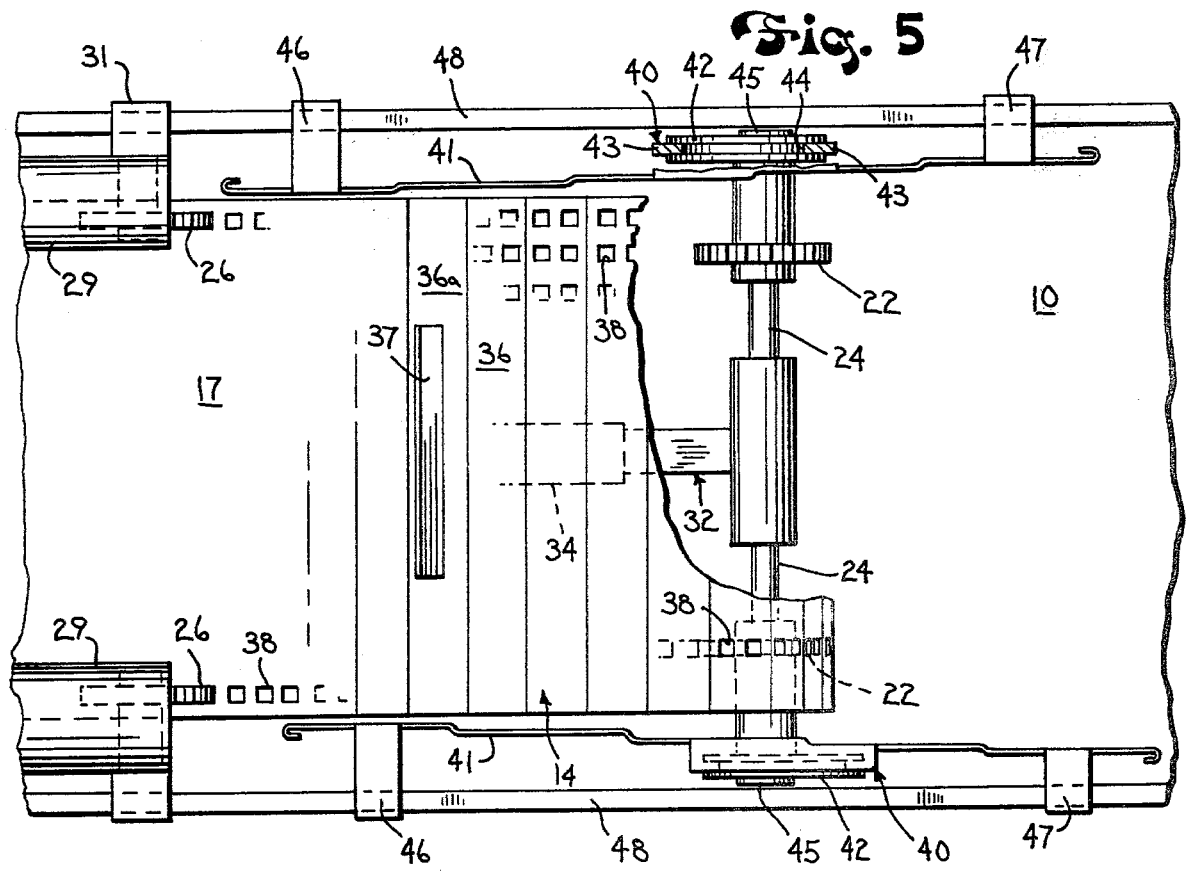
FIG. 5 is an enlarged top plan view of a section of the conveyor which includes the jam breaking mechanism.

The described conveyor mechanism 13 also includes a novel jam breaking mechanism 40 which can be seen in FIGS. 1, 2, 4 and 5. The jam breaking mechanism 40 includes a pair of stepped movable side walls 41 and a pair of cam wheels 42 attached to opposite ends of the idle sprocket wheel axle 24. Each of the stepped side walls 41 has a pair of spaced apart cam wheel engaging legs 43, and the cam wheels 42 have a central leg receiving circumferential groove 44. When the legs 42 are in place in the groove 44 of the cam wheel 42 as seen in FIG. 1 and FIG. 5, the stepped side walls 41 move back and forth as the cam wheel 42 rotates. As seen only in FIG. 5, the cam wheels 42 are positioned outside the idler sprocket wheels 22 on the axle 24 and each end of the sprocket wheel axle 24 is provided with a cap or button 45 which fills the space between the cam wheel 42 and the inside wall of the tank 10. The buttons 45 assist in locating the conveyor properly in the tank or flume 10 and prevents the conveyor from shifting once it is in place.

As seen best in FIGS. 4 and 5, each of the stepped side walls 41 is further provided with a pair of brackets 46 and 47 which serve to space the stepped side wall 41 from the wall of the tank 10. The brackets 46 and 47 are attached to a slide bar 48 which rides upon the top edge of the side walls of the tank 10. The slide bar 48 is preferably of a self-lubricating plastic material such as Delrin, and it insures that the stepped walls 41 will move longitudinally without rocking. The extent of the movement of the stepped walls 41 is shown in Fig. 4 in solid and broken lines. The speed of the back and forth motion of the stepped walls 41 is controlled by controlling the speed of the motor 18 and the belt 17.

The conveyor mechanism 13 is preferably positioned in the tank or flume 10 so that as the cheeses 12 float over the generally horizontal section 14 and contact the inclined section 15 they are tilted slightly backward to make full bottom contact with the conveyor belt 17, so as to minimize damage to the bottoms of the cheese pieces. The point of first contact of the cheeses 12 with the conveyor mechanism 13 can be adjusted by lowering or raising the liquid level in the tank or flume 10 or by varying the incline of the generally horizontal section 14.

The conveyor mechanism 13 shown in the drawings can be removed from the tank or flume 10, if desired, for cleaning or adjustment. To facilitate cleaning, all the parts of the mechanism are made of readily sanitizable materials such as stainless steel or durable plastic.

It will be apparent to those skilled in the art, that although in the foregoing description the conveyor mechanism has been described in connection with the removal of cheeses from a brine tank or flume the same mechanism could be used to remove cheeses or other articles from other liquid baths.

In addition, it will be readily apparent that a number of changes and modifications may be made without departing from the spirit or scope of the prevent invention. For example, in place of the slide bars, other mechanisms which performed the same function could be used. In view of the foregoing, it is to be understood that the invention is not to be limited except by the claims which follow.

I claim:

1. A conveyor for automatically removing floating articles from a liquid bath includes a generally horizontal conveyor section and an integral upwardly inclined conveyor section, said horizontal section being adapted to be positioned below the surface of the liquid so that articles will be carried by the flow of liquid to the inclined section which lifts them out of the liquid, said conveyor further including movable stepped walls located on either side of the horizontal conveyor section, which move back and forth 180° out of phase with one another to gently bump and align the articles and prevent the jamming of the conveyor.

2. The conveyor of claim 1 which includes guard rails along the sides of the inclined conveyor section, which guide rails keep the articles from falling and provide support for the conveyor belt.

3. The conveyor of claim 1 in which the stepped walls are provided with means which engage rotatable cam wheels which rotate to move the stepped walls back and forth.

4. The conveyor of claim 3 in which a single motor drives the conveyor and rotates the cam wheels.

5. A cheese conveyor for automatically removing cheeses floating in a brine solution includes a generally horizontal conveyor section and an integral upwardly inclined conveyor section being adapted to be positioned below the surface of the brine solution so that cheeses will be carried by the flow of liquid to the inclined section which lifts them out of the brine, said conveyor further including movable stepped walls located on either side of the horizontal section which are adapted to move back and forth 180° out of phase with one another so as to gently bump and align the cheeses and prevent them from jamming the conveyor.

6. The conveyor of claim 5 in which there are guard rails along the sides of the inclined section of the conveyor which keep the cheeses from falling and provide support for the conveyor belt.

7. The conveyor of claim 5 in which the stepped walls are provided with means which engage rotating cam wheels to move the stepped walls back and forth.

8. The conveyor of claim 5 in which a single motor drives the conveyor belt and rotates the cam wheels.

9. The conveyor of claim 5 in which all the components which come in contact with the brine and the cheese are made of readily sanitizable materials.

* * * * *